United States Patent Office 2,883,401
Patented Apr. 21, 1959

2,883,401

2,17-DI-LOWER ALKYL-TESTOSTERONES

John C. Babcock, Portage Township, Kalamazoo County, and John A. Hogg and Raymond L. Pederson, Kalamazoo Township, Kalamazoo County, Mich., assignors to The Upjohn Company, Kalamazoo, Mich., a corporation of Michigan No Drawing. Application November 16, 1955
Serial No. 547,309

12 Claims. (Cl. 260—397.45)

This invention relates to novel steroids, more particularly to synthetic hormones of the androstane series, to novel intermediates in the production of these synthetic steroid hormones and to the process for their production.

A process for the production of the novel compounds of the present invention may be represented by the following formulae:

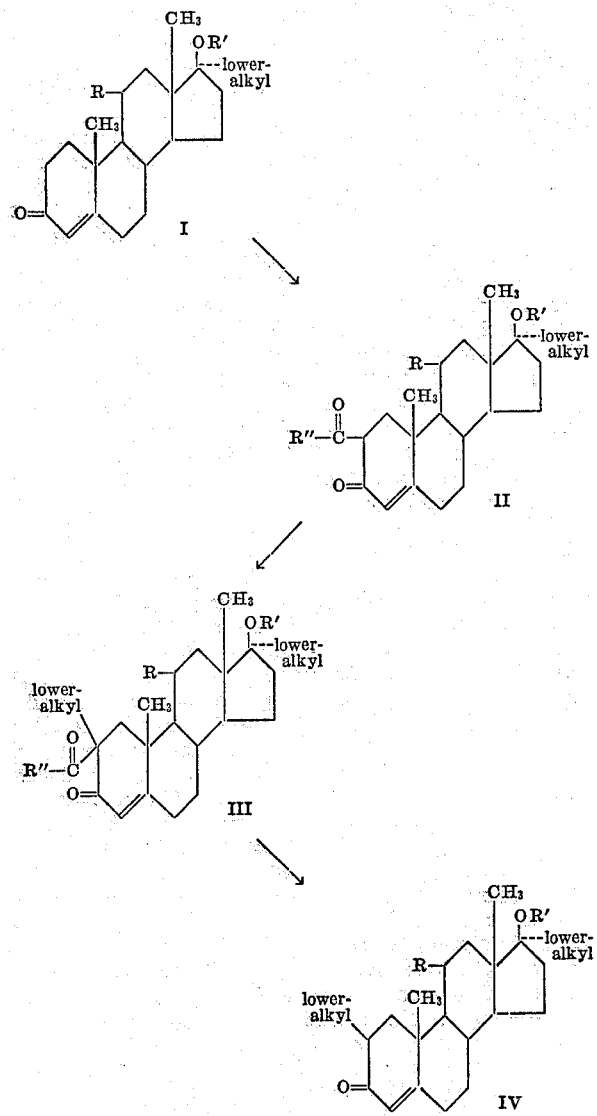

wherein R is hydroxy, which may have either the alpha or beta stereoconfiguration, or keto; wherein R' is hydrogen or the acyl radical of an organic carboxylic acid, preferably a hydrocarbon carboxylic acid containing from one to twelve carbon atoms, inclusive, and wherein R" is hydrogen, carbo-lower-alkoxy, lower-alkoxy and trifluoromethyl, and wherein the lower-alkyl groups each contain from one to eight carbon atoms, inclusive, and are preferably methyl.

It is an object of the present invention to provide novel synthetic steroid hormones of the androstane series. Another object is the provision of steroid intermediates readily convertible to these synthetic steroid hormones. Still another object is the provision of a process for the production of these synthetic steroid hormones. A further object is the provision of a process for the introduction of an alkyl group into the androstane nucleus of certain 11-oxygenated-17-methyltestosterones. Other objects will be apparent to those skilled in the art to which this invention pertains.

According to the present invention an 11-oxygenated-17-lower-alkyltestosterone represented by Formula I, is converted to the novel physiologically active steroids (IV) of the present invention by the following reactions: first, glyoxylation, formylation, carboxylation or trifluoroacetylation to produce a 2-carbonyl derivative (II); second, alkylation to produce the corresponding 2-lower-alkyl-2-carbonyl compound (III); and third, removal of the 2-carbonyl group to produce the 2-lower-alkyl compound (IV) which, if a 17-hydroxy compound, can then be esterified, if desired, to produce a 17-carboxylic acid ester thereof.

The novel 2-lower-alkyl-11-oxygenated-17-lower-alkyl-testosterones (IV), of the present invention, especially those wherein each of the lower-alkyl groups are methyl, possess pronounced oral anabolic and androgenic activity with a higher ratio of anabolic to androgenic activity than 17-methyltestosterone, thus rendering them superior in therapy requiring an anabolic agent where accompanying androgenic activity is undesirable, e.g., in the treatment of females. These novel compounds (IV) of the present invention are useful in maintaining good health in geriatrics, in the relief of radiation nausea, in therapy involving debilitating diseases, and for the treatment of osteoporosis and the reduction in the incidence of dental caries.

The novel 2-lower-alkyl-11-hydroxy-17-lower-alkyl-testosterones (IV) of the present invention are also useful as intermediates in producing other novel, synthetic androgenic and anabolic agents. For example, treatment of a 2 - lower - alkyl-11-hydroxy-17-lower-alkyl-testosterone (IV) of the present invention, preferably wherein R' is the acyl radical of a hydrocarbon carboxylic acid, e.g., acetic acid, with N-bromoacetamide in anhydrous pyridine at about room temperature followed, after about twenty minutes or less, by the addition of anhydrous sulfur dioxide to the resulting mixture, is productive of the corresponding 2-lower-alkyl-9(11)-anhydro-17-lower-alkyltestosterone. Reaction of a 2-lower-alkyl-9-(11)-anhydro-17-lower-alkyltestosterone or a 17-hydrocarbon carboxylic acid ester thereof with N-bromoacetamide in aqueous tertiary butyl alcohol is productive of the corresponding 2-lower-alkyl-9α-bromo-11β-hydroxy-17-lower-alkyltestosterone. Treatment of a 2-lower-alkyl-9α-bromo-11β-hydroxy-17-lower-alkyl-testosterone or acid ester thereof with aqueous sodium hydroxide or sodium methoxide in methanol, is productive of the corresponding 2 - lower - alkyl - 9β,11β-oxido-17-lower-alkyltestosterone. Treatment of a 2-lower-alkyl-9β,11β-oxido-17-lower-alkyltestosterone, preferably wherein both the lower-alkyl groups are methyl, with hydrogen fluoride in aqueous methanol at about room temperature or lower, is productive of the corresponding 2-lower-alkyl-9α-fluoro-11β-hydroxy-17-lower-alkyl-testosterone. Substituting hydrogen chloride for the hydrogen fluoride in this last-described reaction is productive of the corresponding 9α-chloro compound. These 9α-fluoro and 9α-chloro compounds, and especially the fluoro compounds wherein the lower-alkyl groups are each methyl, possess profound androgenic and anabolic activity.

Starting with the 19-normethyl compounds otherwise corresponding to the compounds represented by Formula IV, especially those wherein the lower-alkyl groups are each methyl, and proceeding through the reactions described above, is productive of 19-normethyl compounds otherwise corresponding to the compounds described above, e.g., 2,17α-dimethyl-9α-fluoro-11β,17β-dihydroxy-4-estren-3-one, which compounds also possess significant and useful androgenic and anabolic activity.

The starting 11-hydroxy-17-lower-alkyltestosterone (I) can be prepared in the following manner: 11-keto-17-alkyltestosterones, made by the process of U.S. Patent 2,678,933, is ketalized with ethylene glycol in the presence of p-toluenesulfonic acid, according to techniques well known in the art, to produce the 3-ethylene glycol ketal thereof which is then reduced, e.g., with LiAlH₄, and finally the protecting 3-ketal group is hydrolyzed to regenerate the 3-keto group. The 11-hydroxy-17-alkyltestosterone starting compounds may also be made from 11-hydroxy-4-androstene-3,17-dione by first protecting the 3-keto with a protecting group, e.g., an enamine group, or a ketal group, then converting the 17-keto group to a 17β-hydroxy-17α-alkyl grouping by reaction with lower-alkyl magnesium or lower-alkyl lithium halide Grignard reagent, and finally hydrolyzing the protecting group at the 3-position to regenerate the 3-keto group.

Correspondingly, substituting androstenedione for the 11-hydroxyandrostenedione employed as starting steroid in the reaction described above for the production of 11-keto-17-lower-alkyltestosterone, is productive of a 17-lower-alkyltestosterone which can be bioconverted with *Rhizopus arrhizus* or other 11α-oxygenating species of fungus to produce the corresponding 11α-hydroxy-17-lower-alkyltestosterone.

Similarly, substituting 19-normethylandrostenedione for the 11-hydroxyandrostenedione employed as the starting steroid in the reactions described above for the production of 11-keto-17-lower-alkyltestosterone, is productive of a 19-normethyl-17-lower-alkyltestosterone which can be bioconverted with *Rhizopus arrhizus* or other 11α-oxygenating species of fungus to produce the corresponding 11α-hydroxy-19-normethyl-17-lower-alkyltestosterone, e.g., 11α,17β-dihydroxy-17α-methyl-4-estren-3-one.

The following examples, illustrative of the products of the present invention and a process for their production, are not to be construed as limiting.

EXAMPLE 1

2-methyl-11β-hydroxy-17-methyltestosterone

A. 2-ETHOXYOXALYL-11β-HYDROXY-17-METHYL-TESTOSTERONE

To a solution of 3.18 grams (0.01 mole) of 11β-hydroxy-17-methyltestosterone and 2.9 milliliters of diethyl oxalate dissolved in 45 milliliters of tertiary butyl alcohol at fifty degrees centigrade was added, with stirring, 3.4 milliliters of a 24 percent solution of sodium methoxide in absolute methanol. After twelve minutes, 150 milliliters of ether were added and stirring was continued for an additional fifteen minutes. Then the mixture was filtered and the collected precipitate was washed with ether and dried at 25 degrees centigrade at reduced pressure. The dried precipitate was dissolved in forty milliliters of water to which was then added fifteen milliliters of ten percent hydrochloric acid with stirring and cooling. The resulting precipitate was collected by filtration, washed with water and dried to give 3.57 grams, a yield of 85 percent of the theoretical of 2-ethoxyoxalyl-11β-hydroxy-17-methyltestosterone melting at 120 to 123 degrees centigrade.

B. 2-ETHOXYOXALYL-2-METHYL-11β-HYDROXY-17-METHYLTESTOSTERONE

To a cold solution of 3.4 grams of 2-ethoxyoxalyl-11β-hydroxy-17-methyltestosterone and fifteen milliliters of methyl iodide in thirty milliliters of acetone was added twenty grams of anhydrous potassium carbonate and the resulting mixture was stirred for 64 hours. The mixture was diluted with 300 milliliters of water and then extracted with three 100-milliliter portions of methylene chloride. The combined extracts were washed with water and dried. The methylene chloride was evaporated leaving a glassy residue of 2-ethoxyoxalyl-2-methyl-11β-hydroxy-17-methyltestosterone.

C. 2-METHYL-11β-HYDROXY-17-METHYLTESTOSTERONE

The glassy residue of 2-ethoxyoxalyl-2-methyl-11β-hydroxy-17-methyltestosterone described above was dissolved in twenty milliliters of methanol to which was then added two milliliters of a 24 percent solution of methanolic sodium methoxide and the mixture then allowed to stand for three hours at 25 degrees centigrade. The mixture was then diluted with 100 milliliters of water and extracted with three 50-milliliter portions of methylene chloride. The methylene chloride was evaporated leaving 2.8 grams of residue which was redissolved in fifty milliliters of methylene chloride. The solution was then diluted with fifty milliliters of Skellysolve B hexane hydrocarbons and then poured over a chromatographic column of 120 grams of Florisil synthetic magnesium silicate. The column was developed with 250-milliliter portions of solvent of the following fractions, composition and order: four of Skellysolve B plus five percent acetone, fourteen of Skellysolve B plus six percent acetone, five of Skellysolve B plus seven percent acetone and eight of Skellysolve B plus eight percent acetone. The solvent was evaporated from last Skellysolve B plus seven percent acetone eluate and all but the last Skellysolve B plus eight percent acetone eluates and the combined residual solid, which weighed 1.004 grams, was redissolved in five milliliters of warm acetone to which was then added twelve milliliters of Skellysolve B and the mixture distilled until crystallization commenced. There was thus-obtained 0.587 gram of 2-methyl-11β-hydroxy-17-methyltestosterone melting at 217 to 219 degrees centigrade, having an $[\alpha]_D$ of plus 125 degrees (C, 1.0323 in chloroform) and the analysis below.

Calculated for $C_{21}H_{32}O_3$: C, 75.86; H, 9.70. Found: C, 75.44; H, 9.78.

Following the procedure of Example 1 exactly, but substituting ethyl iodide for the methyl iodide, there is thus produced 2-ethoxyoxalyl-2-ethyl-11β-hydroxy-17-methyltestosterone and 2-ethyl-11β-hydroxy-17-methyltestosterone. Substituting another lower-alkyl halide, e.g., methyl bromide, ethyl bromide, allyl chloride, n-propyl iodide or other alkyl halide wherein the alkyl group contains from one to eight carbon atoms, inclusive, for the methyl iodide, there are produced other 2-ethoxyoxalyl-2-lower-alkyl-11β-hydroxy-17-methyltestosterones and 2-lower-alkyl-11β-hydroxy-17-methyl testosterones, e.g., 2-ethyl-11β-hydroxy-17-methyltestosterone, 2-n-propyl-11β-hydroxy-17-methyltestosterone.

Substituting another 11β-hydroxy-17-lower-alkyltestosterone, e.g., 11β-hydroxy-17-ethyltestosterone, 11β-hydroxy-17-n-propyltestosterone, or other 11β-hydroxy-17-lower-alkyltestosterone wherein the 17-lower-alkyl group contains from one to eight carbon atoms, inclusive, as the starting steroid in Example 1, there are thus produced other 2-ethoxyoxalyl-2-methyl-11β-hydroxy-17-lower-alkyltestosterones and 2-methyl-11β-hydroxy-17-lower-alkyltestosterones, e.g., 2-methyl-11β-hydroxy-17-ethyltestosterone and 2-methyl-11β-hydroxy-17-n-propyltestosterone and other 2-methyl-11β-hydroxy-17-n-propyltestosterones wherein the 17-lower-alkyl group contains from one to eight carbon atoms, inclusive.

Similarly, by selection of the appropriate 11β-hydroxy-17-lower-alkyltestosterone as the starting steroid and the appropriate lower-alkyl halide as the alkylating agent, combinations of the above compounds, e.g., 2,17-di-lower-alkyl-11β-hydroxytestosterones are prepared according to the method of Example 1 wherein both of the lower-alkyl groups are other than methyl, e.g., ethyl, propyl, or other lower-alkyl group.

Following the procedure of Example 1 but substituting another di-lower-alkyl oxalate for the diethyl oxalate, e.g., dimethyl oxalate, dipropyl oxalate, methyl propyl oxalate, methyl butyl oxalate, other 2-methyl-2-lower-alkoxyoxalyl-11β-hydroxy-17-methyltestosterones are prepared which are also converted to 2-methyl-11β-hydroxy-17-methyltestosterone.

Substituting a lower-alkyl formate for the diethyl oxalate employed in Example 1, e.g., methyl formate, ethyl formate, there are thus produced 2-formyl-11β-hydroxy-17-methyltestosterone and 2-formyl-2-methyl-11β-hydroxy-17-methyltestosterone which is also converted to 2-methyl-11β-hydroxy-17-methyltestosterone in the manner described in Example 1. Similarly, substituting a lower-alkyl trifluoroacetate, e.g., methyl or ethyl trifluoroacetate, for the diethyl oxalate of Example 1, is productive of 2-trifluoromethylacetyl-11β-hydroxy-17-methyltestosterone and 2-trifluoroacetyl-2-methyl-11β-hydroxy-17-methyltestosterone which is also converted to 2 - methyl - 11β - hydroxy - 17 - methyltestosterone. A 2 - carbo - lower - alkoxy - 11β - hydroxy - 17 - methyltestosterone, which is similarly converted to 2-methyl-11β-hydroxy-17-methyltestosterone, is prepared by substituting a lower-alkyl carbonate, e.g., ethyl carbonate, for the diethyl oxalate of Example 1.

EXAMPLE 2

*2-methyl-11α-hydroxy-17-methyltestosterone*

Following the procedure of Example 1 exactly, but substituting 11α-hydroxy-17-methyltestosterone, prepared, for example, by the bioconversion with *Rhizopus arrhizus* of 17-methyltestosterone according to the method of U.S. Patent 2,602,769, as the starting steroid, there is thus produced 2 - methyl - 11α - hydroxy - 17 - methyltestosterone as the final product.

EXAMPLE 3

*2-methyl-11-keto-17-methyltestosterone*

To a stirred solution of 0.4 millimole of 2-methyl-11α-hydroxy-17-methyltestosterone dissolved in 17.5 milliliters of glacial acetic acid and thereafter cooled to fourteen degrees centigrade is added dropwise, over a period of twenty minutes, a solution of 0.0825 gram of chromium trioxide dissolved in 1.65 milliliters of glacial acetic acid and 1.65 milliliters of water. The temperature of the stirred solution is thereafter allowed to rise to eighteen degrees centigrade over a period of one hour. The excess chromium trioxide is destroyed by the addition of an aqueous sodium sulfite solution and the product then extracted from the reaction mixture with three fifteen-milliliter portions of ether which are thereafter combined, washed with water, and dried over anhydrous sodium sulfate. Evaporation of the ether leaves a residue consisting essentially of 2-methyl-11-keto-17-methyltestosterone, M.P. 227.5–229.5 degrees centigrade (sintering at 225 degrees centigrade), $[\alpha]_D$=plus 198 degrees (C=1.1 percent chloroform).

2-methyl-11-keto-17-methyltestosterone is also prepared by employing 11-keto-17-methyltestosterone, prepared, for example, by the chromic acid oxidation of 11α-hydroxy-17-methyltestosterone or 11β-hydroxy-17-methyltestosterone, as the starting steroid in the reaction described in Example 1.

Instead of the compounds employed as starting steroids for the reactions described in Examples 1, 2 and 3, the corresponding 17-acyl esters thereof can be employed, e.g., the 17-acetate thereof, with the reaction product in each case including the same reaction product obtained when the corresponding free 17-hydroxy compound is employed as the starting steroid as well as some unhydrolyzed 2 - methyl - 11 - oxygenated - 17 - methyltestosterone 17-acylate.

EXAMPLE 4

*2-methyl-11β-hydroxy-17-methyltestosterone 17-acetate*

A mixture of 0.5 gram of 2-methyl-11β-hydroxy-17-methyltestosterone is dissolved in ten milliliters of acetic acid and an excess of acetic anhydride added. The reaction is refluxed for about six hours and then poured into ice water. The 17-acetate is recovered from the cooled reaction mixture by crystallization.

EXAMPLE 5

*2-methyl-11β-hydroxy-17-methyltestosterone 17-propionate*

Following the procedure of Example 4, but substituting propionic anhydride for the acetic anhydride, there is thus produced 2-methyl-11β-hydroxy-17-methyltestosterone 17-propionate.

Similarly, 2-methyl-11β-hydroxy-17-methyltestosterone is converted to other 2-methyl-11β-hydroxy-17-methyltestosterone 17-acylates by esterification of the 17-hydroxy group, e.g., by reaction with the appropriate acid anhydride, acid chloride or bromide, ester by ester exchange, acid in the presence of an esterification catalyst, etc. Examples of 2-methyl-11β-hydroxy-17-methyltestosterone 17-acylates prepared include those wherein the acyl group is the acyl radical of, for example, a lower-aliphatic acid, e.g., formic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts), e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidyl-propionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

The corresponding 17-acylate esters of 2-methyl-11-keto-17-methyltestosterone are prepared from 2-methyl-11-keto-17-methyltestosterone in the same manner as described above, for the preparation of esters of 2-methyl-11β-hydroxy-17-methyltestosterone.

Employing 2-methyl-11α-hydroxy-17-methyltestosterone as the starting steroid in these esterification reactions results, when an excess of esterification agent is employed, in the 11,17-diacylate esters of 2-methyl-11α-hydroxy-17-methyltestosterone whereas, when about equi-chemical equivalents of esterification agent are employed, a 2- methyl-11α-hydroxy-17-methyltestosterone 17-acylate is isolated as the reaction product.

EXAMPLE 6

2,17α-dimethyl-17β-hydroxy-4,9(11)-androstadien-3-one

To a solution of one gram of 2-methyl-11β-hydroxy-17-methyltestosterone dissolved in ten milliliters of dry pyridine was added, with stirring at 25 degrees centigrade and in a nitrogen atmosphere, 0.5 gram of N-bromoacetamide portionwise. The stirring was continued for fifteen minutes and the mixture was then cooled to ten degrees centigrade. Anhydrous sulfur dioxide gas was then bubbled into the cooled mixture until the mixture gave a negative test with acidified starch-iodide paper. The stirred mixture was then mixed with ten milliliters of water followed by cold dilute hydrochloric acid prepared by mixing fifteen milliliters of concentrated hydrochloric acid with 25 grams of ice. The precipitated solid was collected, washed with water, dried and then crystallized from a mixture of methylene chloride and Skellysolve B hexane hydrocarbons and then from dilute acetone to give 2,17α-dimethyl-17β-hydroxy-4,9(11)-androstadien-3-one, having a melting point of 150–153 degrees centigrade.

Analysis.—Calculated for $C_{21}H_{30}O_2$: C, 80.21; H, 9.62. Found: C, 80.46; H, 9.75.

EXAMPLE 7

2,17-dimethyl-9α-bromo-11β-hydroxytestosterone

To a solution of one gram of 2,17α-dimethyl-17β-hydroxy-4,9(11)-androstadien-3-one dissolved in fifty milliliters of acetone was added dropwise, with stirring, one gram of N-bromoacetamide in 25 milliliters of water. A solution of twenty milliliters of perchloric acid was then slowly added at fifteen degrees centigrade. After twenty minutes, sufficient aqueous sodium sulfite was added to discharge the yellow color of the solution. The resulting clear solution was diluted with 100 milliliters of water to precipitate 2,17-dimethyl-9α-bromo-11β-hydroxytestosterone.

Similarly, substituting N-iodosuccinimide for the N-bromoacetamide is productive of 2,17-dimethyl-9α-iodo-11β-hydroxytestosterone.

EXAMPLE 8

2,17-dimethyl-9β,11β-epoxytestosterone

A suspension of one gram of 2,17-dimethyl-9α-bromo-11β-hydroxytestosterone in thirty milliliters of methanol was titrated with one molar equivalent of N/10 aqueous sodium hydroxide. The mixture was diluted with water and chilled to give 2,17-dimethyl-9β,11β-epoxytestosterone having a melting point of 175–176 degrees centigrade and an $[\alpha]_D$ of minus ten degrees (concentration of .0895 in chloroform).

Similarly, 2,17-dimethyl-9β,11β-epoxytestosterone is prepared by the reaction of 2,17-dimethyl-9α-iodo-11β-hydroxytestosterone with aqueous sodium hydroxide.

EXAMPLE 9

2,17-dimethyl-9α-fluoro-11β-hydroxytestosterone

To a solution of 0.5 gram of 2,17-dimethyl-9β,11β-epoxytestosterone in ten milliliters of methylene chloride in a polyethylene bottle at room temperature was added two milliliters of 48 percent hydrochloric acid. The mixture was stirred at room temperature for five hours, then cautiously poured with stirring into a mixture of six grams of sodium bicarbonate in ice and water. The precipitated product was extracted with methylene chloride which was then washed with water and dried. The methylene was concentrated and cooled to precipitate 2,17-dimethyl-9α-fluoro-11β-hydroxytestosterone, having a melting point of 179–180 degrees centigrade and an $[\alpha]_D$ of plus 110 degrees (chloroform).

Analysis.—Calculated for $C_{21}H_{31}FO_3$: C, 71.97; H, 8.92; F, 5.42. Found: C, 70.72; H, 9.73; F, 5.29.

Similarly, 2,17-dimethyl-9α-chloro-11β-hydroxytestosterone is prepared by substituting hydrochloric acid for the hydrofluoric acid in the reaction described above.

The corresponding 10-normethyl compounds, i.e., 2,17α - dimethyl - 17β - hydroxy-4,9(11)-estradien-3-one, 2,17α-dimethyl-9α-bromo - 11β,17β - dihydroxy-4-estren-3-one, 2,17α-dimethyl - 9β,11β - epoxy - 17β - hydroxy-4-estren-3-one, and 2,17α-dimethyl-9α-fluoro-11β,17β-dihydroxy-4-estren-3-one are similarly prepared starting with 11β,17β-dihydroxy-17α-methyl-4-estren-3-one as the starting steroid in the series of reactions described above.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. 2,17-dimethyl-11β-hydroxytestosterone represented by the following formula:

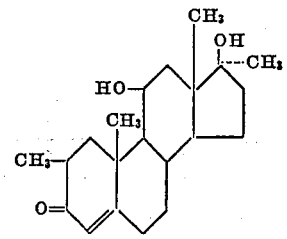

2. 2,17 - dimethyl-11β-hydroxytestosterone 17-acylate represented by the following formula:

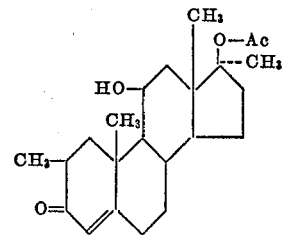

wherein Ac represents the acyl radical of a hydrocarbon carboxylic acid containing from one to twelve carbon atoms, inclusive.

3. 2,17α-dimethyl-11β-hydroxytestosterone 17-acetate.

4. 2,17α-dimethyl-11β-hydroxytestosterone 17-propionate.

5. 2,17α-dimethyl-11α-hydroxytestosterone.

6. 2,17α-dimethyl-11-ketotestosterone.

7. A process for the production of 2,17α-di-lower-alkyltestosterones which comprises the steps of (1) condensing a compound selected from the group consisting of 11β-hydroxy-17α-lower-alkyltestosterone, 11α-hydroxy-17α - lower-alkyltestosterone, 11-keto-17α-lower-alkyltestosterone, and 17-organic carboxylic acid esters thereof, with a compound selected from the group consisting of di-lower-alkyl oxalate, lower-alkyl formate, lower-alkyl carbonate and lower-alkyl trifluoroacetate, in the presence of an alkali-metal condensing agent, to produce the alkali-metal enolate of a 2-carbonyl-17α-lower-alkyl-11-oxytestosterone represented by the following formula:

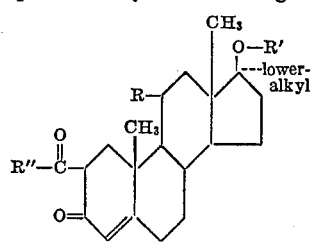

wherein R is selected from the group consisting of hydroxy and keto, R' is selected from the group consisting of hydrogen and the acyl radical of an organic carboxylic acid, and R" is selected from the group consisting of hydrogen, carbo-lower-alkoxy, lower-alkoxy and trifluoromethyl; (2) alkylating the thus-produced alkali-metal enolate with a lower-alkyl halide whose halogen has an atomic weight from 35 to 127, inclusive, to produce the corresponding 2-lower-alkyl-2-carbonyl compound; and (3) removing the 2-carbonyl group with an alkali-metal lower-alkoxide and an alkanol, to produce a 2,17α-dimethyl-11-oxytestosterone represented by the following formula:

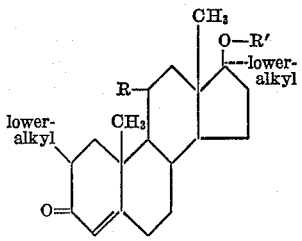

wherein R and R' have the values given hereinbefore.

8. The process of claim 7 wherein the starting compounds of step (1) are lower-alkyl oxalate and 11β-hydroxy-17-methyltestosterone and the lower-alkyl halide in step (2) is a methyl halide.

9. The process of claim 7 wherein the starting compounds of step (1) are methyl oxalate and 11β-hydroxy-17-methyltestosterone and the alkali-metal condensing agent is an alkali-metal methoxide, wherein the lower-alkyl halide in step (2) is a methyl halide and, in step (3), the lower-alkanol is methanol and the alkali-metal alkoxide is an alkali metal methoxide.

10. 2,17-di-lower-alkyltestosterone represented by the following formula:

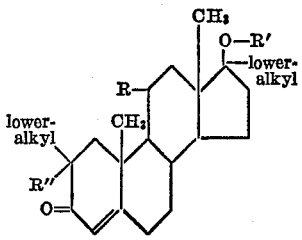

wherein the lower-alkyl groups each contain from one to eight carbon atoms, inclusive, R is selected from the group consisting of hydroxy and keto, R' is selected from the group consisting of hydrogen and the acyl radical of an organic hydrocarbon carboxylic acid containing from one to twelve carbon atoms, inclusive, and R" is selected from the group consisting of formyl, carbo-lower-alkoxy, lower-alkoxyoxalyl, and trifluoroacetyl.

11. 2-lower-alkyl-17α-methyl-11β-hydroxytestosterone represented by the following formula:

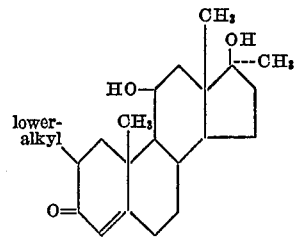

wherein the lower-alkyl group contains from one to eight carbon atoms, inclusive.

12. 2-lower-alkyl-17α-methyl-11-ketotestosterone represented by the following formula:

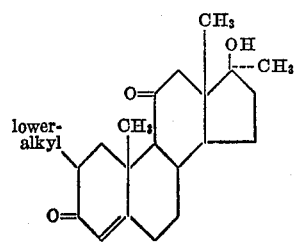

wherein the lower-alkyl group contains from one to eight carbon atoms, inclusive.

References Cited in the file of this patent
UNITED STATES PATENTS
2,678,933    Meister _____ May 18, 1954